Oct. 23, 1962 V. J. HABISOHN 3,060,331
REJUVENATING TIMER
Filed Feb. 19, 1960
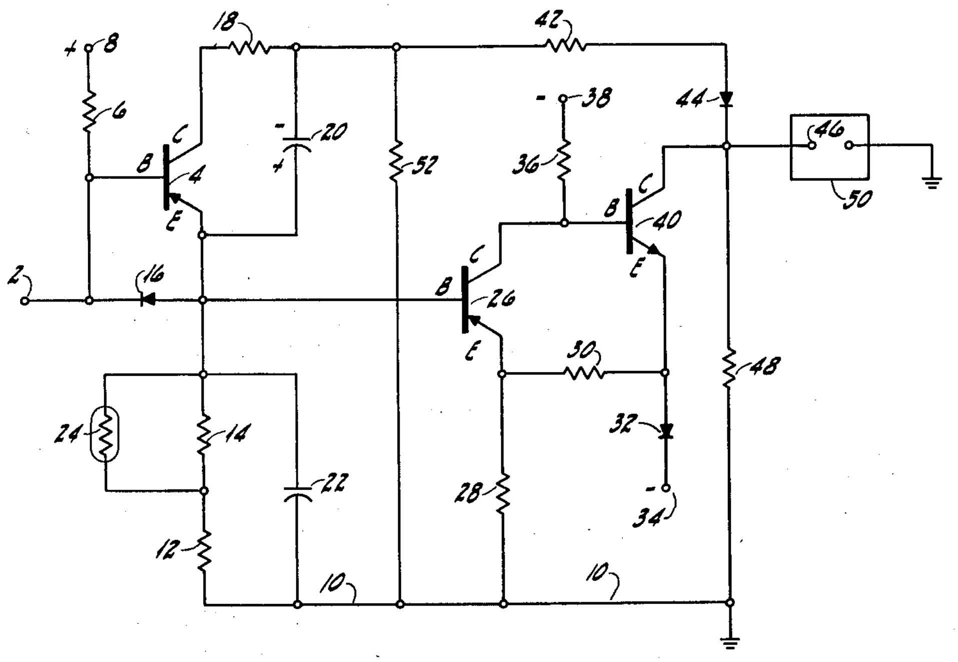
INVENTOR.
VICTOR J. HABISOHN
BY
ATTORNEY

United States Patent Office 3,060,331

Patented Oct. 23, 1962

3,060,331

REJUVENATING TIMER

Victor J. Habisohn, Oak Lawn, Ill., assignor to International Telephone and Telegraph Corporation Filed Feb. 19, 1960, Ser. No. 9,922
29 Claims. (Cl. 307—88.5)

This invention relates to signal control systems and more particularly to rejuvenating timer systems of the semi-conductor type.

While not limited thereto, the invention is especially applicable to signalling systems for providing accurately timed unidirectional output pulses in response to random or periodic input pulses.

Heretofore, timer systems having capacitors in their feedback circuits provided accurately timed output pulses only if such capacitors had sufficient time to discharge during the time intervals between input triggering pulses. When the input triggering pulses are randomly spaced in time, such systems have the disadvantage that they are unable due to varying incomplete discharge of the capacitors to provide accurately timed output pulses which are referenced from the respective input pulses. Therefore, it is desirable to provide signal control circuitry of the semi-conductor type which overcomes the aforementioned disadvantages and provides accurately timed output pulses in response to periodic or random input triggering pulses and which is operable to provide constant unidirectional output voltage when the time interval between input pulses is less than its time out period or in response to a unidirectional input voltage of constant value. It is also desirable to provide such circuitry with temperature compensation and protection against false operation by extraneous, short duration input pulses.

An object of the invention is to provide a new and improved signal control system.

A more specific object of the invention is to provide an improved rejuvenating timer of the semi-conductor controlled type.

Another specific object of the invention is to provide an improved signal pulse timer having provision for rapidly resetting the same during its input triggering period.

A related object of the invention is to provide such timer with improved means affording temperature compensation.

Another related object of the invention is to provide such timer with improved means affording protection against false operation by extraneous, short duration pulses.

In accordance with the invention, a signal pulse control system is provided with semi-conductor control devices and an energy storage timing device for providing timed unidirectional output pulses of the same polarity as and in response to random or periodic input triggering pulses. In order accurately to control the timing of the output pulses, provision is made for rejuvenating the system by rapidly and substantially completely discharging the energy storage timing device responsive to receipt of each input triggering pulse. A capacitor is provided for by-passing extraneous, short duration pulses to ground to protect against false operation of the input circuit. Additional operational accuracy is attained by providing a heat responsive element such as a thermistor in the timing circuit to compensate for temperature changes.

The aforementioned and other objects and advantages of the invention, together with an exemplary manner of obtaining them, will become more apparent and the invention will be best understood from the following detailed description of an embodiment of the invention in conjunction with the accompanying drawings in which:

The figure shows a signal pulse timing control system constructed in accordance with the invention.

Referring to the single figure of the drawing, there is shown a signal pulse control system of the rejuvenating timer type having an input terminal 2. Input terminal 2 is connected directly to base electrode B of a rejuvenating control static or semi-conductor device such as a transistor 4 of the P-N-P conductivity type or the like. Base B is also connected through a resistor 6 to a source 8 of positive bias voltage for normally maintaining transistor 4 non-conducting. Input terminal 2 is also connected to ground in a circuit extending from ground through conductor 10, resistors 12 and 14 and a unidirectional conducting device such as a diode 16 to input terminal 2, the junction of resistor 14 and diode 16 being connected directly to emitter E of transistor 4 for normally applying ground potential to emitter E. Collector electrode C of transistor 4 is connected through a resistor 18 and a timing capacitor 20 to emitter E of transistor 4. A capacitor 22 is connected across resistors 12 and 14 for by-passing extraneous pulses. A heat responsive element such as a thermistor 24 having a negative temperature coefficient of resistance is connected across resistor 14 for adjusting the total resistance to compensate for ambient temperature changes.

A control circuit for a static or semi-conductor device such as a transistor 26 of the P-N-P conductivity type or the like is provided by the direct connection of the junction of resistor 14 and diode 16 to base electrode B of transistor 26 and the connection of emitter E of transistor 26 through a resistor 28 and conductor 10 to ground. Emitter E of transistor 26 is also connected through a resistor 30 and a low impedance unidirectional conducting device such as a diode 32 to a source 34 of negative voltage for normally maintaining transistor 26 non-conducting. Collector electrode C of transistor 26 is connected through a resistor 36 to a source 38 of negative voltage, the junction of collector C and resistor 36 being connected to base B of a static or semi-conductor device such as a transistor 40 of the N-P-N conductivity type or the like for normally maintaining the latter nonconducting. Emitter electrode E of transistor 40 is connected through the aforementioned diode 32 to negative source 34. The junction of resistor 18 and timing capacitor 20 is connected through a resistor 42 and a unidirectional conducting diode 44 to an output terminal 46, the latter being connected directly to collector electrode C of transistor 40 and through a resistor 48 to ground. Output terminal 46 is connected through a load device 50 to ground or to a source of positive voltage. The junction of resistor 18 and capacitor 20 is connected through a resistor 52 of relatively high value to conductor 10.

The operation of the system will now be described.

Normally a positive voltage is applied from source 8 through resistor 6 to base B and ground voltage is applied through conductor 10 and resistors 12 and 14 to emitter E of transistor 4 to maintain the latter nonconducting. Diode 16 prevents current flow from positive source 8 to ground which current flow if permitted might prevent operation of transistor 26. Current flows from ground through conductor 10, resistors 28 and 30 and diode 32 to negative source 34. As a result, the voltage divider comprising resistors 28 and 30 applies a negative voltage from the junction thereof to emitter E and ground voltage is applied through resistor 12 and 14 to base B of transistor 26 to maintain the latter non-conducting. A negative voltage is applied from source 38 through resistor 36 to base B while a relatively less negative voltage is applied from source 34 due to the voltage drop in diode 32 to emitter E of transistor 40 to maintain the latter non-conducting.

Let it be assumed that a negative voltage pulse of the proper magnitude and duration is applied to input terminal 2. As a result, current flows from ground through conductor 10, resistors 12 and 14 and diode 16 to input terminal 2. The voltage drop across diode 16 is applied across emitter E and base B of transistor 4 to afford positive forward bias voltage to render the latter conducting. Therefore, if capacitor 20 had been previously charged in the direction shown by the plus and minus symbols, it will be rapidly discharged through emitter E and collector C of transistor 4 and resistor 18. Such rapid discharge of capacitor 20 rejuvenates or resets the system so that it will thereafter function to afford an accurately timed output pulse as hereinafter described.

The aforementioned current flow through resistors 12 and 14 provides positive forward bias voltage to render transistor 26 conducting. Thus, the voltage drop across series connected resistors 12 and 14 is applied through conductor 10 and resistor 28 across emitter E and base B of transistor 26 to bias the latter "on." Capacitor 22 affords a short time delay in the operation of transistor 26 and thus provides a short time delay between the leading edge of the input pulse and the initiation of an output voltage pulse. This time delay is brought about because current flows initially from ground through conductor 10, capacitor 22 and diode 16 to input terminal 2. When capacitor 22 becomes charged, the current then flows through resistors 12 and 14 to render transistor 26 conducting as hereinbefore described. Capacitor 22 also functions to by-pass extraneous, short duration pulses. Input pulses which have a duration insufficient to charge capacitor 22 are by-passed through the latter in shunt of resistors 12 and 14 and, therefore, are ineffective to render transistor 26 conducting. Thus, the input pulses to be effective must have a minimum duration sufficient to charge capacitor 22 and thereafter to cause current flow through resistor 12 and 14 to operate transistor 26.

It will be recalled that a negative voltage was applied from the junction of resistors 28 and 30 to maintain transistor 26 non-conducting. The voltage drop across resistors 12 and 14 is greater than the voltage drop across resistor 28. Thus, the voltage at emitter E becomes positive relative to the voltage at base B of transistor 26 to effect conduction of the latter. As a result, current flows from ground through conductor 10, resistor 28, emitter E and collector C of transistor 26 and resistor 36 to negative source 38. The voltage drop across resistor 36 is greater than the voltage drop across diode 32 and is utilized to apply positive bias voltage to base B of transistor 40. Emitter E being now negative relative to base B of transistor 40, the latter is rendered conducting. As a result, current flows through load device 50, output terminal 46, collector C and emitter E of transistor 40 and diode 32 to negative source 34. As the voltage drop in the main conduction path of transistor 40 is negligible and in diode 32 is very small, a negative voltage is provided at output terminal 46 responsive to the last mentioned current flow. Thus, there is in effect a low impedance negative voltage source at output terminal 46.

Output terminal 46 provides a negative unidirectional output pulse for a time duration depending upon the charging time of capacitor 20. Due to the aforementioned effective negative voltage source at the output terminal, feedback current flow is initiated in a circuit extending from ground through conductor 10, resistors 12 and 14, emitter E and collector C of transistor 4, resistor 18 and 42, diode 44, collector C and emitter E of transistor 40 and diode 32 to negative source 34. When the input triggering pulse terminates to discontinue current flow through diode 16, transistor 4 is rendered non-conducting by the positive bias voltage applied from source 8 through resistor 6 to base B thereof to terminate rapid discharge of capacitor 20. When transistor 4 is non-conducting due to the absence of an input pulse, any charge that remains on capacitor 20 is discharged slowly in a circuit extending through resistors 14 and 12, conductor 10 and resistor 52. When transistor 4 is rendered non-conducting, the feedback current is diverted through capacitor 20 in shunt of transistor 4 and resistor 18 and capacitor 20 begins to charge in the direction shown by the plus and minus symbols. During the charging time of capacitor 20, a continuous unidirectional negative output voltage pulse is applied to load device 50. After a predetermined time interval depending upon the value of resistance in series with capacitor 20, the latter charges to a value whereby the voltage at base B becomes more positive than the voltage at emitter E of transistor 26 to reverse bias the latter and render the same non-conducting. This in turn causes negative voltage to be applied from source 38 through resistor 36 to base B of transistor 40 to render the latter non-conducting. As a result, ground potential is applied through resistor 48 to output terminal 46 to terminate the output pulse. Diode 44 prevents substantial reverse current flow in the feedback circuit after the output pulse is terminated.

The duration of each output pulse is maintained substantially constant over a wide temperature range. To this end, thermistor 24 is connected in parallel with resistor 14 in the resistance-capacitance timing circuit. Thermistor 24 having a negative temperature coefficient of resistance, resistance changes which would otherwise occur in the circuit in response to temperature changes are compensated for by thermistor 24 to maintain the total resistance substantially constant over a wide temperature range. Consequently, the value of the current flow through capacitor 20 is regulated for each output pulse and the output pulses are of constant duration.

It will be apparent that the system responds to periodic input pulses and random input pulses having varying time intervals therebetween to provide output pulses having constant time durations. The rapid discharge of capacitor 20 in response to the receipt of each input pulse resets the system so that it will accurately time the duration of each output pulse even if the input pulses are not accurately spaced in time. When the time interval between input pulses is less than the time out period of the resistance-capacitance timing circuit of the system, a constant negative output voltage is provided. Moreover, the system responds to a constant negative direct current output voltage.

While the invention hereinbefore described is effectively adapted to fulfill the objects stated, I do not intend to confine my invention to the particular preferred embodiment of static control circuit disclosed, inasmuch as it is susceptible of various modifications without departing from the scope of the appended claims.

I claim:

1. In a signal control system for providing an accurately timed electrical output pulse for each electrical input pulse of a series of input pulses, circuit control means operable in response to receipt of each input pulse for causing initiation of an output pulse, feedback control means comprising an electrical energy storage device responsive to initiation of each output pulse for maintaining operation of said circuit control means thereby to maintain each output pulse following termination of each input pulse, said energy storage device being effective after a predetermined time interval for rendering said circuit control means ineffective thereby to terminate each output pulse, and static control means operable in response to receipt of each succeeding input pulse for causing rapid discharge of electrical energy from said energy storage device, and said static control means being further operable responsive to termination of each such succeeding input pulse for terminating said rapid discharge of energy from said energy storage device thereby to prepare the latter for timing the next output pulse.

2. The invention defined in claim 1, together with high resistance means for controlling discharge of the remaining electrical energy from said energy storage device after said further operation of said static control means.

3. The invention defined in claim 1, wherein said circuit control means comprises a capacitive circuit for shunting extraneous short duration input pulses therefrom thereby to prevent the latter from initiating unwanted output pulses.

4. The invention defined in claim 1, wherein said circuit control means comprises a capacitor for affording a time delay between the leading edge of an input pulse and the initiation of an output pulse thereby to absorb extraneous short duration input pulses and to prevent the latter from initiating unwanted output pulses.

5. The invention defined in claim 1, wherein said feedback control means comprises a heat responsive element for adjusting the rate of storage of energy in said energy storage device thereby to compensate for temperature changes over a wide range and to maintain the duration of the output pulses constant.

6. The invention defined in claim 1, wherein said static control means comprises a controllable semi-conductor device responsive to each input pulse for establishing a rapid discharge circuit for said energy storage device, and bias voltage control means responsive to termination of each input pulse for rendering said semi-conductor device ineffective.

7. The invention defined in claim 6, wherein said bias voltage control means comprises a unidirectional conducting device responsive to each input pulse for rendering said semi-conductor device conducting to establish a discharge path for said energy storage.

8. The invention defined in claim 1, wherein said feedback control means comprises a unidirectional conducting device for preventing substantial reverse current flow to said energy storage device following termination of an output pulse.

9. The invention defined in claim 1, wherein said circuit control means comprises first and second controllable semi-conductor devices of opposite conductivity types normally biased to non-conducting conditions, bias voltage control means responsive to each input pulse for rendering said first semi-conductor device conducting, means responsive to conduction of said first semi-conductor device for rendering said second semi-conductor device conducting to afford an output pulse, means connecting the output of said second semi-conductor device to said energy storage device to control storage of energy in the latter, and means connecting said energy storage device to said bias voltage control means to maintain said first semi-conductor device conducting for a predetermined time interval.

10. The invention defined in claim 9 wherein said control circuit means further comprises low impedance means connecting said second semi-conductor device to a voltage source for normally maintaining said second semi-conductor device non-conducting and for providing a low impedance output when said second semi-conductor device is rendered conducting.

11. In a signal control system for providing an accurately timed electrical output pulse for each electrical input pulse of a series of input pulses which may be randomly spaced in time, said system comprising an input terminal and an output terminal, circuit control means operable in response to receipt of an input pulse at said input terminal for causing initiation of an output pulse at said output terminal, timing means comprising an electrical energy storage device responsive to initiation of said output pulse for maintaining operation of said circuit control means thereby to maintain said output pulse following termination of said input pulse, said energy storage device being effective after a predetermined time interval for rendering said circuit control means ineffective thereby to terminate said output pulse, and static control means operable in response to receipt of a succeeding input pulse at said input terminal for causing rapid discharge of the electrical energy from said energy storage device, said static control means being further operable responsive to termination of said succeeding input pulse for terminating said rapid discharge of energy thereby to preset said energy storage device for timing the next output pulse.

12. In a rejuvenating timer for providing an accurately timed unidirectional output voltage pulse for each unidirectional input voltage pulse of a series of input pulses and of the same polarity, first semi-conductor control means for initiating an output voltage pulse, timing means for timing the duration of said output voltage pulse, second semi-conductor control means for rapidly resetting said timing means to prepare the latter for timing an output voltage pulse unidirectional means responsive to an input voltage pulse of a given polarity for controlling said second semi-conductor control means to reset said timing means, bias control means also responsive to said input voltage pulse for controlling said first semi-conductor control means to initiate an output voltage pulse of the same polarity as each said input voltage pulse, and means responsive to initiation of said output voltage pulse and termination of said input voltage pulse for rendering said timing means effective to time the duration of said output voltage pulse, said timing means controlling said bias control means to maintain said output voltage pulse for a predetermined time interval after termination of said input voltage pulse.

13. The invention defined in claim 12, wherein said first semi-conductor control means comprises first and second transistors of opposite conductivity types, said bias control means being effective to render said first transistor conducting responsive to receipt of an input voltage pulse, and means responsive to conduction of said first transistor for rendering said second transistor conducting to afford an output voltage pulse of the same polarity as said input voltage pulse.

14. In a rejuvenating timer for providing an accurately timed unidirectional output voltage pulse for each unidirectional input voltage pulse of a series of input pulses which may be randomly spaced in time and of the same polarity, a first transistor circuit for initiating output voltage pulses, a capacitor for timing the duration of said output voltage pulses, a second transistor circuit for establishing a rapid discharge circuit for said capacitor, means comprising a unidirectional conducting diode operable in response to each input voltage pulse of a given polarity for operating said second transistor circuit to establish said rapid discharge circuit for said capacitor for the duration of each said input voltage pulse, bias control means also operable in response to each said input voltage pulse for operating said first transistor circuit to initiate an output voltage pulse of the same polarity as each said input voltage pulse, and feedback means responsive to initiation of each output voltage pulse and termination of each said input voltage pulse for causing current flow through said bias control means to charge said capacitor, said current flowing through said bias control means controlling operation of said first transistor circuit to maintain each said output voltage pulse for a predetermined time interval depending upon the charging time of said capacitor, and said bias control means being responsive to a predetermined charge on said capacitor for rendering said first transistor circuit ineffective thereby to terminate each said output voltage pulse.

15. The invention defined in claim 14, together with a unidirectional diode in said feedback means for preventing reverse current flow in the latter when each output voltage pulse is terminated.

16. The invention defined in claim 15, together with a resistor of relatively high value connecting said capacitor and said bias control means in a loop circuit for discharging the remaining charge on said capacitor when said rapid discharge circuit is rendered ineffective at the end of each input voltage pulse.

17. The invention defined in claim 14, wherein said bias control means comprises resistance means in series circuit with said diode for rendering said first transistor circuit operative in response to each input voltage pulse, and a capacitor connected across said resistance means for absorbing extraneous short duration pulses.

18. The invention defined in a claim 14, wherein said bias control means comprises resistance means in series circuit with said timing capacitor, and a thermistor having a negative coefficient of resistance connected across at least a portion of said resistance means and operable over a wide temperature range to vary the resistance in the timing capacitor circuit to compensate for temperature changes.

19. The invention defined in claim 14, wherein said second transistor circuit comprises a transistor having emitter and collector and base electrodes, a resistor connected in series with said emitter and collector electrodes across said capacitor to form a rapid discharge circuit for said capacitor, and means biasing the emitter-base junction of said transistor to maintain the latter normally non-conducting, said diode being connected across said emitter and base electrodes to render said transistor conducting in response to an input voltage pulse.

20. The invention defined in claim 14, wherein said first transistor circuit comprises first and second transistors of opposite conductivity types each having emitter and collector and base electrodes, means biasing the emitter-base junction of said first transistor to maintain the latter normally non-conducting, said bias control means being effective in response to each input voltage pulse for rendering said first transistor conducting, means comprising a low impedance unidirectional conducting diode biasing the emitter-base junction of said second transistor to maintain the latter normally non-conducting, means responsive to conduction of said first transistor for rendering said second transistor conducting, and means including said low impedance diode and said emitter and collector electrodes of said second transistor for providing a low impedance output circuit.

References Cited in the file of this patent

UNITED STATES PATENTS

| | | |
|---|---|---|
| 2,827,574 | Schneider | Mar. 18, 1958 |
| 2,828,450 | Pinckaers | Mar. 25, 1958 |
| 2,840,727 | Guggi | June 24, 1958 |
| 2,929,939 | Ingham | Mar. 22, 1960 |
| 2,945,174 | Hetzler | July 12, 1960 |
| 2,947,875 | Beck | Aug. 2, 1960 |
| 2,949,545 | White | Aug. 16, 1960 |